Oct. 26, 1971   HAYAO YAMAZAKI ET AL   3,615,120
ANTI-SKID BRAKE CONTROL DEVICE

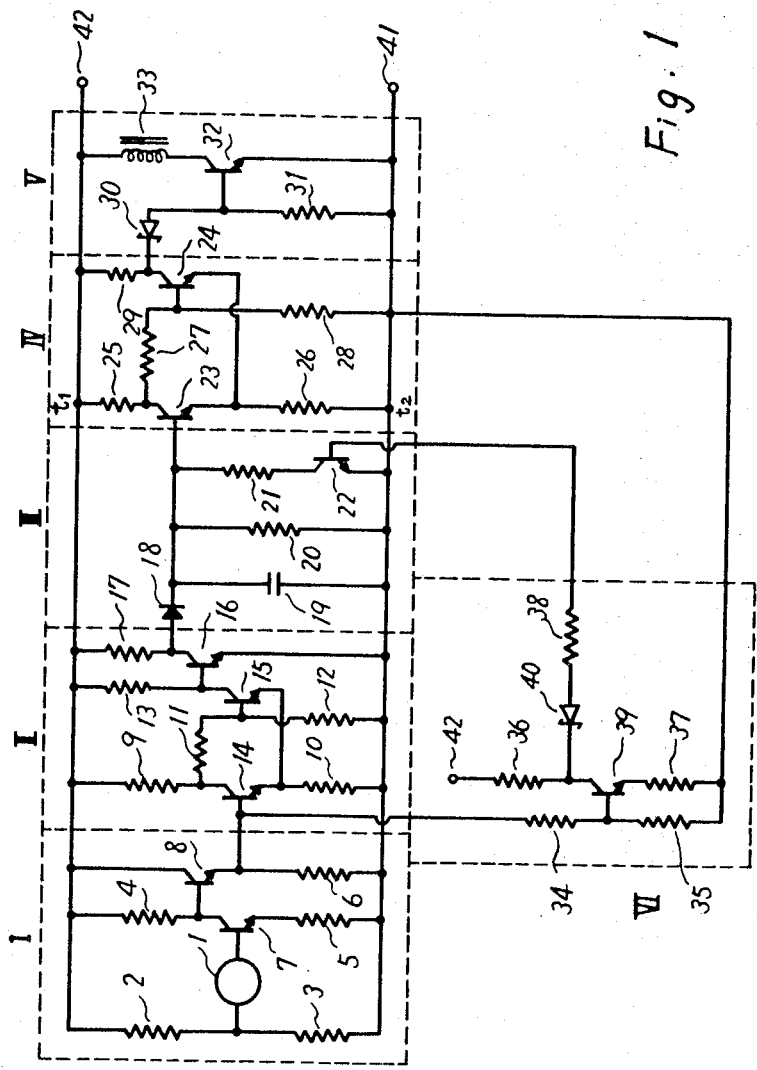

Filed Sept. 10, 1969   5 Sheets-Sheet 3

INVENTORS
HAYAO YAMAZAKI
TOSIAKI OKAMOTO

BY

ATTORNEY

United States Patent Office 3,615,120
Patented Oct. 26, 1971

3,615,120
ANTI-SKID BRAKE CONTROL DEVICE
Hayao Yamazaki, Ikoma-gun, Nara-ken, and Tosiaki Okamoto, Hekikai-gun, Aichi-ken, Japan; said Yamazaki, assignor to Hayakawa Denkikogyo Kabushiki Kaisha, Osaka, Japan
Filed Sept. 10, 1969, Ser. No. 856,588
Claims priority, application Japan, Sept. 11, 1968, 43/65,349, 43/65,350
Int. Cl. B60t 8/12
U.S. Cl. 303—21 BE
7 Claims

ABSTRACT OF THE DISCLOSURE

An anti-skid device for vehicles having a brake releasing circuit activated in response to a detected signal indicating retardation of the wheels in excess of a predetermined value and deactivated by a detected signal indicating acceleration of the wheels, a charge storage circuit being charged in response to a detected signal indicating retardation of the wheels and discharged only in response to a detected signal indicating acceleration of the wheels, and a circuit for making the brake releasing time shorter in response to a faster acceleration as detected by the acceleration-retardation signal detector.

This invention relates to a brake control device for vehicles and more particularly to a control circuit for controlling the action of a brake including an anti-skid brake control device arranged to prevent skidding of the wheels and to obtain sufficient braking effect.

If a vehicle moving at a high speed or on a slippery road surface is suddenly subjected to an excessive braking force, its wheels tend to lock. The wheels locked in this manner have a tendency to slide over the road, especially in a lateral direction and causes loss of control of the direction of the vehicle, extends the stopping distance and causes various other dangerous accidents.

Known brake control devices according to the prior art have been provided with means for reducing such skidding. According to the prior art, means are arranged so that the moving wheels are forced to slow down when a force is applied to the braking system of the vehicle, and the skid reducing means includes detecting means for detecting reduction in the speed of rotation of the wheels, and means for generating an electric signal when reduction in the speed of rotation of the wheels is detected. The electric signal is then applied to operate brake releasing means to release the brake for a predetermined time. Upon release, the vehicle accelerates by its own inertia, but a force is again applied to the brake after the lapse of said predetermined time. In this manner the brake is actuated and released repeatedly until the vehicle comes to a complete stop.

In prior known brake control devices, however, the brake releasing time is constant, and this tends to cause skidding and makes it difficult to obtain a sufficient braking effect. When the friction coefficient is large, as in the case of dry pavements, even if the brake is released for a short duration, the wheels do not become locked for a period of time because they are sufficiently accelerated within that time. On the other hand, when the friction coefficient is small, as in the case of snow and ice, even if the brake release time is short, the wheels are scarcely accelerated, and they remain in their substantially locked state during the successive intervals between the activations. Consequently, the brake cannot effectively prevent lateral slip. In addition, the slow release of the brake causes slow acceleration of the wheels. While the slow release reduces the danger of lateral slip, it extends the stopping distance unnecessarily.

Therefore, an object of this invention is to provide an improved brake control device to overcome the above-mentioned disadvantages.

Such disadvantages can be removed by relating the brake releasing time to the condition of the road surface and especially by making the brake releasing time short for a road surface having a large friction coefficient but long for a road surface having a small friction coefficient. More specifically, the release of the brake may be controlled in conjunction with acceleration and retardation of the wheels since a rate of change of the speed of rotation of the wheels is related to the condition of the road surface (friction coefficient).

According to this invention, there is provided an anti-skid brake control device which is adapted to actuate the brake releasing means in response to a detected signal indicating retardation of the wheels and deactivate said brake releasing means by a detected signal indicating acceleration of the wheels. This results in a braking effect suited to the condition of the road surface.

According to another feature of this invention, there is provided means for making the brake releasing time shorter in response to a faster acceleration of the wheels as detected by the signal detecting means. The brake releasing time can be changed thereby in response to changes in acceleration.

According to a further feature of this invention, there is provided means for releasing the brake in response to a detected signal indicative of retardation of the wheels when the rate of retardation is less than a predetermined level. This makes it possible to block release of the brake when the moving wheels are retarded slowly.

According to an additional feature of this invention, there is provided means for changing the brake releasing time in response to a detected signal indicating the maximum retardation of the wheels, and this makes it possible to release the brake in response to the retardation.

These and other objects, features, and operation effects of this invention will be more clearly understood from the following description with reference to the accompanying drawings representing several embodiments thereof.

In the drawings:

FIG. 1 is a circuit diagram representing an anti-skid brake control device according to this invention;

FIG. 4a is a waveform diagram used for explaining the operation of the circuit of FIG. 1a.

Figure 1A:
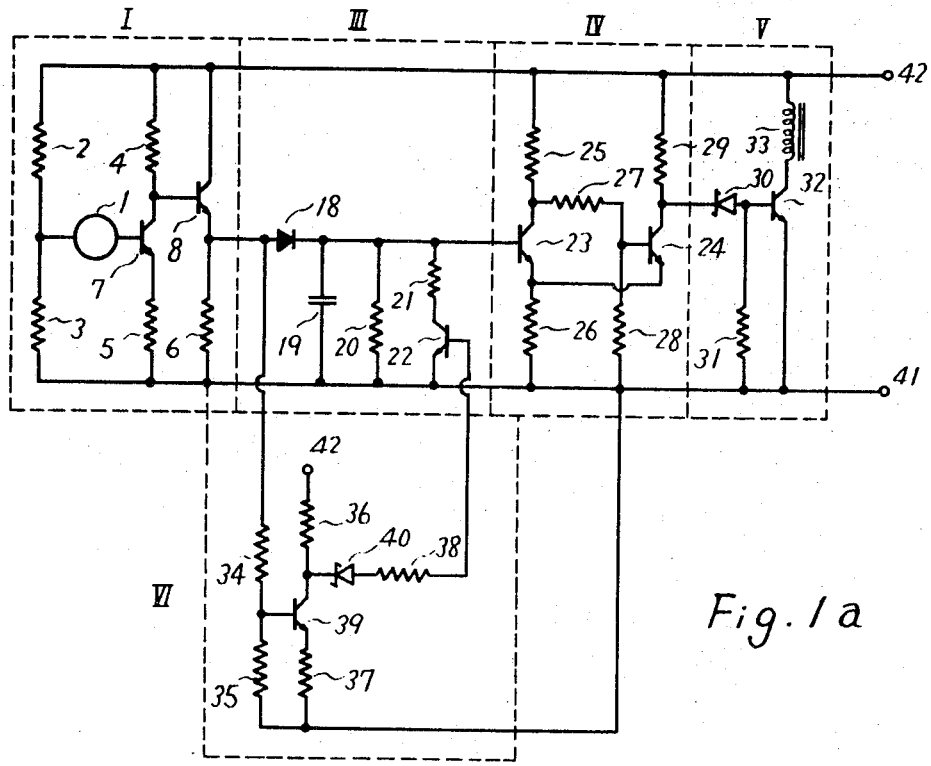
FIG. 1a is a circuit diagram similar to FIG. 1, a part of which is modified.

An embodiment of this invention shown in FIG. 1 consists of six stages of electric control circuit, I, II, III, IV, V and VI. The stage I is a signal generating circuit including an acceleration and retardation signal generator 1 (hereinafter referred to as a signal generator 1) which detects retardation of the rear wheels when the brakes are applied and acceleration thereof when the brakes are released and generates a pair of electric signals representing the retardation and acceleration, respectively, and an amplifier circuit comprising resistors 2, 3, 4, 5, and 6 and transistors 7 and 8. The signal generator 1 and the resistors 2 and 4 are connected in series between the base and collector electrodes of the transistor 7. The collector electrode of the transistor 8 is connected to the junction of the resistors 2 and 4 and said junction is also connected to a terminal 42. The junction of the signal generator 1 and the resistor 2, the emitter electrode of the transistor 7 and the emitter electrode of the transistor 8 are connected to a terminal 41 through resistors 3, 5 and 6 respectively. The collector electrode of the transistor 7 is connected to the base electrode of the transistor 8.

Figure 2:
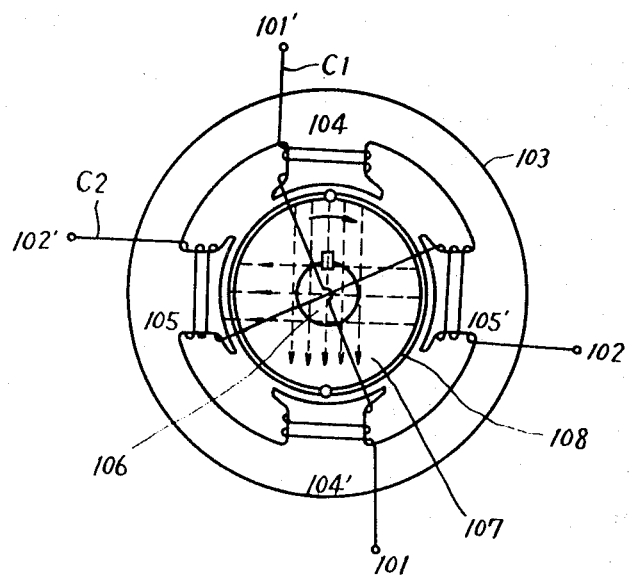
FIG. 2 is a cross-sectional diagram of a generator used for detecting acceleration and retardation of rotation of the wheels in FIG. 1.

An embodiment of the signal generator 1 is a quadratic differentiation generating device, shown in FIG. 2, which derives a rate of change of the speed of rotation as an output thereof.

Referring to the drawing, a coil C1 is wound in the same direction on a pair of mutually facing yokes 104 and 104' of a field core 103 and supplied with a direct current. A detection coil C2 is wound in the same direction on another pair of mutually facing yokes 105 and 105' which are disposed substantially vertically to the yokes 104 and 104' on the same core 103. A rotor 107 is arranged in the center of the four yokes. The peripheral surface of the rotor 107 is covered with a conductor 108 which is secured to the rotor.

When the rotor 107 rotates, if a current is supplied to the coil C1, a magnetic flux is generated by said coil C1, which passes the rotor 107 from the yoke 104 to the yoke 104'. When the rotor 107 starts to rotate in the direction of the arrow, a current is induced in a portion of the conductor 108 facing the yoke 104 in the direction and sense perpendicular to and entering the paper and, at the same time, another current is induced in another portion of the conductor 108 facing the yoke 104' in the direction and sense perpendicular to and coming out of the paper. The voltage induced across the conductor 108 is proportional to a speed of the conductor cutting the magnetic flux, that is, the speed of rotation of the rotor 107. The induced current induces a magnetic flux from the yoke 105' to the yoke 105 as shown in the drawing, which passes the coil C2 wound on the yokes 105 and 105'. If the speed of rotation of the rotor 107 is constant, the voltage induced across the conductor 108 is constant and the magnetic flux induced by said voltage is also constant. Therefore, as long as the rotor 107 continues to rotate at a constant speed, voltage will not be induced across the terminals 102 and 102' of the detection coil C2, since there is no variation of the magnetic flux. When the speed of rotation of the rotor 107 varies abruptly, the voltage induced in the conductor 108 also varies abruptly and results in a variation of the magnetic flux passing the detection coil. The variation of the magnetic flux induces a potential difference between the terminals 102 and 102', which is proportional to a rate of change of the speed of rotation, that is, to the angular acceleration. The polarities of the voltages induced between the terminals 102 and 102' in retardation and acceleration are mutually opposite. Thus, a potential difference appears across the detection coil C2 only when a change of speed of rotation of the rotor occurs, that is, only at the time of acceleration or retardation.

While the present quadratic differentiation generating device has a configuration energized by the coil C1, it can be constituted by use of a permanent magnet for the same purpose. The signal generator 1 is not limited to such a quadratic differentiation generating device and those which can generate an electric signal corresponding to retardation and acceleration of the wheels are sufficient for this purpose.

The operation of the circuit of FIG. 1 will be described hereunder with reference to FIG. 4. The signal generator 1 generates a positive signal when retardation is detected and a negative signal when acceleration is detected. The signal from the signal generator 1 is amplified in the amplifier circuit and generates a signal having a waveform as shown by the curve A in FIG. 4(1) at the emitter electrode of the transistor 8 which is the output terminal of the stage I.

This signal is applied to the stage II which is a setting circuit consisting of a known Schmitt circuit including resistors 9, 10, 11, 12 and 13 and transistors 14 and 15 and a signal inverting circuit including a resistor 17 and a transistor 16.

In the Schmitt circuit, the transistor 14 has the base electrode connected to the emitter electrode of the transistor 8, the collector electrode connected through the resistor 9 to the terminal 42 and the emitter electrode connected through the resistor 10 to the terminal 41, and the transistor 15 has the base electrode connected through the resistor 11 to the collector electrode of the transistor 14 and also connected through the resistor 12 to the terminal 41, the collector electrode connected through the resistor 13 to the terminal 42 and the emitter electrode connected to the emitter electrode of the transistor 14. In the signal inverting circuit, the transistor 16 has the base electrode connected to the collector electrode of the transistor 15, the emitter electrode connected to the terminal 41 and the connected to the collector electrode of the transistor 15, the the terminal 42.

Figure 4:
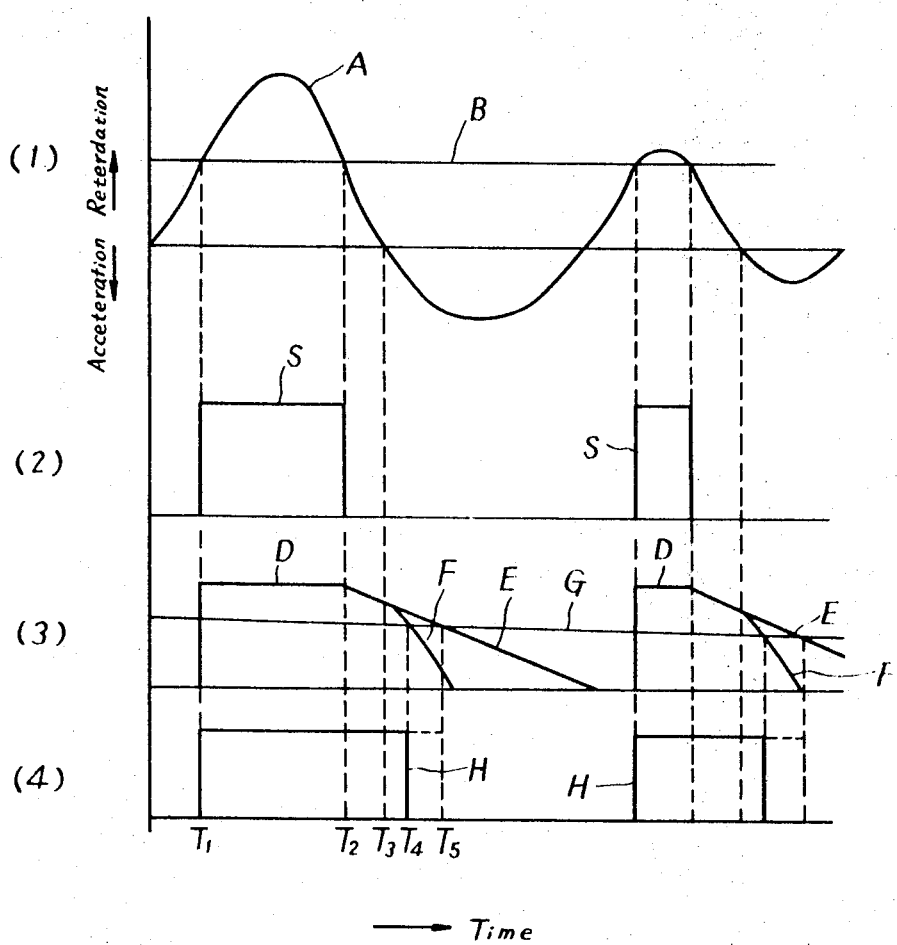
FIG. 4 is a waveform diagram representing waveforms at various portions of the circuit of FIG. 1, used for explaining the operation of said circuit.

When the signal applied from the stage I to the stage II, the setting circuit, exceeds a preset level B shown in FIG. 4(1) determined by the circuit parameters of the Schmitt circuit, an output signal is derived therefrom. This signal is inverted in the signal inverting circuit and an output signal as shown by the wave form S in FIG. 4(2) is generated from the collector electrode of the transistor 16 and applied to the next stage III.

The stage III is a charging and discharging circuit including a diode 18, a capacitor 19, resistors 20 and 21 and a transistor 22. A series connection of the diode 18 and the capacitor 19 is connected between the collector and emitter electrodes of the transistor 16. The resistor 20 is connected in parallel with the capacitor 19. The transistor 22 has the emitter electrode connected to one end of the capacitor 19 and the collector electrode connected through the resistor 21 to the other end of the capacitor 19.

The capacitor 19 is charged by the input signal supplied from the stage II and discharged when said signal ceases. FIG. 4(3) represents a waveform of the voltage across the capacitor 19, which is charged in response to the input signal S as shown by the curve D, then discharged slowly through the resistor 20 when the input signal ceases as shown by the curve E and, when the transistor 22 conducts, discharged quickly through said transistor as shown by the curve F. Conduction of said transistor 22 is controlled in response to a signal from the stage VI.

The stage VI is a releasing signal shortening circuit including resistors 34, 35, 36, 37, and 38, a transistor 39 and a Zener diode 40. The transistor 39 has the base electrode connected through the resistor 34 to the emitter electrode of the transistor 8 and also connected through the resistor 35 to the terminal 41, the collector electrode connected through the resistor 36 to the terminal 42 and the emitter electrode connected through the resistor 37 to the terminal 41. The collector electrode of the transistor 39 is also connected through a series connection of the Zener diode 40 and the resistor 38 to the base electrode of the transistor 22.

In the operation of the releasing signal shortening circuit, the collector potential of the transistor 39 increases in response to reception of a negative signal from the stage I. Conduction of the transistor 14 is controlled by this collector potential. The collector potential of the transistor 39 is such that the transistor 14 is nonconductive when the signal applied from the stage I is positive and conductive when it is negative. Since the collector potential of the transistor 39 increases in response to the signal applied from the stage I, the greater absolute value of the negative signal will result in heavier conduction of the transistor 14. That is, the greater acceleration signal will result in the greater absolute value of the negative signal, the heavier conduction of the transistor 14 and then quicker discharge of the capacitor 19. The voltage signal across said capacitor 19 is applied to the next stage IV which is a releasing signal circuit consisting of a Schmitt circuit including transistors 23 and 24 and resistors 25, 26, 27, 28 and 29.

The transistor 23 has the base electrode connected to one end of the capacitor 19, the emitter electrode connected through the resistor 26 to the other end of the capacitor 19 and the collector electrode connected through the resistor 25 to the terminal 42. The transistor 24 has the base electrode connected through the resistor 28 to the terminal 41 and connected through the resistor 27 to the collector electrode of the transistor 23, the emitter electrode connected to the emitter electrode of the transistor 23 and the collector electrode connected through the resistor 29 to the terminal 42.

In the operation of this circuit, when the input signal applied from the capacitor 19 in the stage III exceeds a preset level G determined by the circuit parameters of the Schmitt circuit, a releasing signal H as shown in FIG. 4(4) is generated at the collector electrode of the transistor 24 while it is exceeding said level, which is applied to the next stage V.

The stage V supplied with the releasing signal from the stage IV is a releasing circuit including a resistor 31, a Zener diode 30, a transistor 32 and a solenoid 33. The transistor 32 has the base electrode connected through the Zener diode to the collector electrode of the transistor 24 and connected through the resistor 31 to the terminal 41, the emitter electrode connected to the terminal 41 and the collector electrode connected through the releasing solenoid 33 to the terminal 42.

In the operation of this circuit, the transistor 32 conducts while the releasing signal is supplied from the stage IV to energize the solenoid 33. The solenoid 33, when energized, drives the means for releasing the brakes by utilizing electromagnetic force, vacuum pressure or the like.

Figure 3:
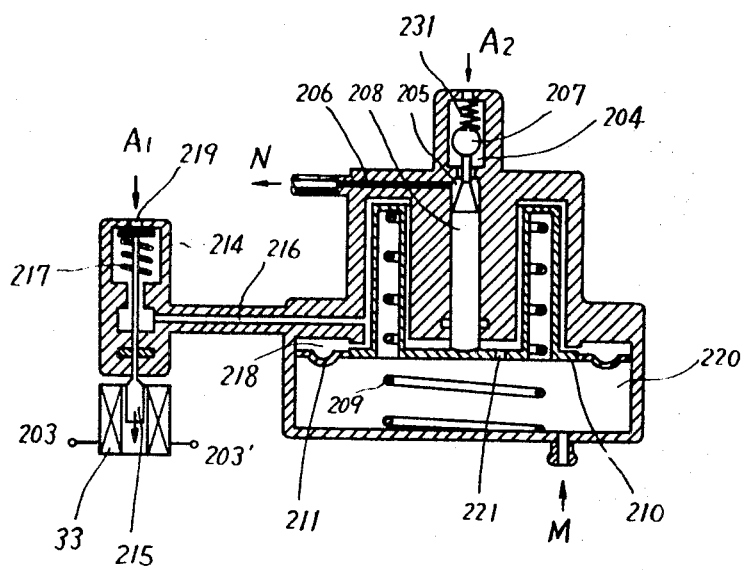
FIG. 3 is a vertical sectional diagram of a brake oil pressure mechanism relating to FIG. 1.

One embodied mechanism of the means of releasing the brake will be described hereunder with reference to FIG. 3, though it is not limited thereto. A plunger 215 operated by the solenoid 33 is arranged to open and close an air inlet 219. The atmospheric pressure introduced communicates through a pipe 216 to a chamber 218 in one side of a plunger support 210 which is supported floatingly by a diaphragm 211, and a chamber 220 in the other side of the plunger support 210 is connected to an engine manifold M and is maintained at a negative pressure. The plunger support 210 is constantly pushed up by a spring 209 and supports on the center thereof a plunger 208 which contacts at the top with a check ball 207 which is constantly pressed down by a spring 231 and arranged to control communication of a master cylinder pressure through a conduit 206 to a wheel cylinder N. When the solenoid 33 is not energized, the both chambers 218 and 220 are kept at a same pressure through a small hole 211.

When a current is supplied to the solenoid 33, a solenoid plunger 215 is pulled down against a spring 217 to introduce air from an opening 219 in the direction of the arrow A1 and the air is led through a pipe 216 to the chamber 218. The plunger 208 comes down to shut down the master cylinder pressure applied from the direction of the arrow A2 by the check ball 207. If the plunger further comes down, the volume of the chamber 205 increases and the wheel cylinder pressure is lowered, thereby the brake is released.

The operation of the embodiment of FIG. 1 will be again described with reference to FIG. 4.

When the brake pedal is pressed to actuate the brakes, the number of rotations of the wheels decreases and a positive retardation signal is generated in the signal generator 1. This signal is amplified in the amplifier circuit to become a positive output signal, as shown by the curve A in FIG. 4(1), generated at the emitter electrode of the transistor 8, which is then applied to the stages II and VI.

When the brake pedal is pressed slowly, the rotational speed of wheels decreases slowly, and their retardation is small and the amplitude of the above mentioned signal is also small. Therefore, no output signal is generated from the Schmitt circuit in the stage II. When the brake pedal is pressed fast and hard, the rotational speed of the wheels is decreased quickly, and the retardation is large and the above mentioned retardation signal increases and exceeds the preset level B of the Schmitt circuit at a time T1. As the retardation signal exceeds the present level B, an output is generated from the Schmitt circuit and an output signal shown by the curve S in FIG. 4(2) appears at the collector electrode of the transistor 16. The output signal S ceases at a time T2 when the output signal A from the stage I becomes small (that is, retardation becomes small) and decreases below the preset level B. The capacitor 19 supplied with the positive signal S from the stage II is charged up to a potential corresponding to the magnitude of the signal S through the diode 18 as shown in FIG. 4(3). The potential of said capacitor 19 is further applied to the base electrode of the transistor 23 in the stage IV. Since the value of said potential is selected to exceed a preset level G of the Schmitt circuit in the stage IV, an output is generated from the Schmitt circuit and a brake releasing signal as shown by the curve H in FIG. 4(4) is applied to the releasing circuit in the next stage V to cause the transistor 32 to conduct. Due to conduction of said transistor 32, a large current flows through the solenoid 33 to energize brake releasing means to release the brake of the wheels. The Zener diode 30 is inserted so as to insure the operation of the transistor 32 only when the releasing signal H is generated. The capacitor 19 is discharged only through the resistor 20 at a time T2 when the input signal S from the stage II ceases. That is to say, since the collector potential of the transistor 39 in the stage VI is low when the positive signal is applied from the stage I, the transistor 22 in the stage III is maintained nonconductive and the discharge of the capacitor 19 is executed only through the resistor 20. This discharge is carried out gradually along the curve E in FIG. 4(3) and, when the potential of the capacitor 19 becomes less than the preset level G of the stage IV at a time T5, the transistor 23 in the next stage becomes nonconductive to disable the solenoid 33. Thus, the brake force is automatically applied to the brakes of the wheels again and the rotational speed of the wheels is retarded.

When the brake is released due to operation of the stage V as described in the above, the rotation of the wheels are again accelerated by the inertia of the vehicle to generate a negative signal, corresponding to the magnitude of acceleration of the wheels by the signal generator 1 and the output signal A of the stage I soon becomes negative and is applied to the stage VI. Since the level of this negative signal is lower than the preset level of the stage II, it does not cause the stage to generate any signal. When the negative signal is applied from the stage I to the stage VI, the collector potential of the transistor 39 increases gradually and, at last, it causes the transistor 22 in the stage III to conduct. The transistor 22 conducts at a time T3 and the capacitor 19 discharges not only through the resistor 20 but also through the resistor 21 and the transistor 22, thereby shortening its discharge time. This discharge is carried out along the curve F of FIG. 4(3) and, when the potential of the capacitor 19 becomes lower than the preset level G of the stage IV at a time T4, the output from the Schmitt circuit in the section IV ceases to stop the release of the brake.

The conduction of the transistor 22 results in the quicker discharge of the capacitor 19 and the degree of said conduction corresponds to the collector potential of the transistor 39 in the stage VI, that is, to the level of the acceleration signal from the stage I. Therefore, a faster acceleration results in a quicker discharge of the capacitor 19 and a shorter time duration T4.

Thus, the releasing signal H that releases the brake is generated only for a period T4–T1. Therefore, the releasing time becomes shorter with the time T4–T1 in the case of no acceleration becoming shorter than the time T5–T1 and larger than T5–T1 in the presence of acceleration.

More specifically, on a road surface having a large friction coefficient, the acceleration of the wheels becomes large at the time the brake is released, and the brake releasing time becomes short. In contrast, on a road surface having a small friction coefficient, the acceleration of the wheels is small, and the brake releasing time is long.

As a result of such repetition of actuation and release of the brake, the vehicle comes to a stop.

Figure 1B:
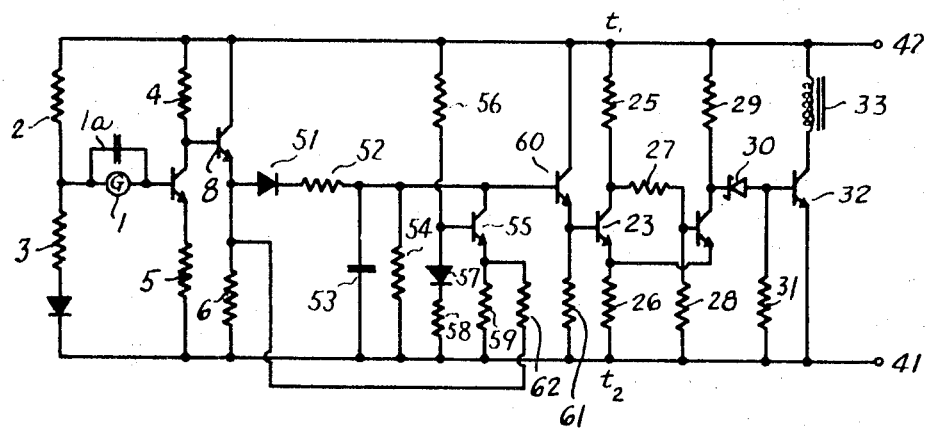
FIG. 1b is a circuit diagram similar to FIG. 1, a part of which is further modified.

Now, the description will be made in conjunction with some other embodiments which are partial modifications of the arrangement of FIG. 1 and are shown in FIGS. 1a and 1b. In the drawings, the like components are indicated by the like reference numerals.

Referring to FIG. 1a, the emitter electrode of the transistor 8 is connected through the diode 18 to one end of the capacitor 19 and the junction of the resistors 5 and 6 is connected to the other end of said capacitor 19. The stage II in FIG. 1 is omitted. The arrangement of FIG. 1a will be described with reference to FIG. 4a.

When the brake pedal is pressed to brake the wheels, an output signal A is generated from the emitter electrode of the transistor 8 applied through the diode 18 to the capacitor 19. This capacitor 19 is charged up to a potential corresponding to the level of said output signal A, as shown by the curve B in the drawing. This potential of the capacitor 19 is also applied to the stage IV and if the level of said potential exceeds the preset level G of the stage IV, an output signal is generated from the Schmitt circuit in the stage IV and a brake releasing signal is applied to the releasing circuit in the stage V to release the brake.

After the capacitor 19 is charged up to a potential corresponding to the level of a positive signal from the stage I, while the positive signal continues to be applied from said stage I, the transistor 22 is nonconductive since the collector potential of the transistor 39 is low, and the capacitor 19 discharges slowly through the resistor 20 along the curve D. When the potential of said capacitor 19 is gradually lowered by the discharge and becomes lower than the preset level G of the stage IV, the releasing signal from the stage IV disappears and is not applied to the releasing circuit in the stage V. Therefore, the release of the brake is interrupted and braking is again applied to the wheels.

Under the above conditions if the brake is released, the wheels are accelerated and a negative output signal is produced from the stage I and applied to the stage VI. This output signal is blocked by the diode to be applied to the capacitor 19. With application of the negative signal to the stage VI, the collector voltage of the transistor 39 increases and at last causes the transistor 22 to conduct. Therefore, the capacitor 19 is discharged quickly through not only the resistor 20 but also the transistor 22 along the curve E, thereby shortening its discharge time. Moreover, this discharge time is shortened in correspondence with the level of the acceleration signal to accelerate the potential to reach the preset level G of the stage IV and to shorten the releasing time.

Figure 4A:
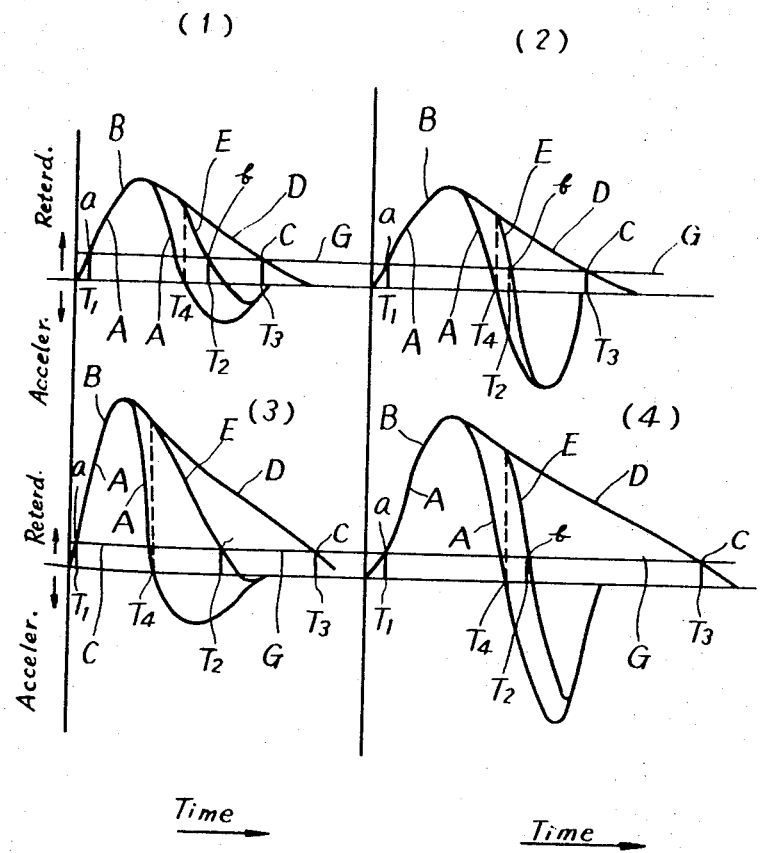

The relation between the charging and discharging conditions of the capacitor 19 and the time of generation of the output signal of the Schmitt circuit in the stage IV will be described with reference to FIG. 4a. As the wheels are retarded and accelerated with the application and release of the brake, the output signal from the stage I varies as shown by the curve A in FIG. 4a. The capacitor 19 is charged in response to the retardation signal and the potential thereof increases along the curve B and reaches the preset level G of the stage IV at a point $a$ (time T1). From the time T1, the stage IV begins to generate the output signal. The capacitor 19 is discharged after the potential thereof reaches the maximum value corresponding to the maximum of the retardation signal. When the capacitor 19 discharges only through the resistor 20, the discharge is carried out gradually along the curve D and the potential reaches the preset level G of the stage IV at a point $c$ (time T3). At the time T3, the output signal from the stage IV ceases. If the wheels are then accelerated by release of the brake, the capacitor 19 discharges through not only the resistor 20 but also the resistor 21 and the transistor 22 and, as shown by the curve E, the potential decreases quickly from the time T4 when the acceleration signal starts and reaches the preset level G of the stage IV at a point $b$. The output signal from the stage IV ceases at this time. In FIG. 4a, (1) represents a state wherein both the retardation and acceleration are small, (2) represents a state wherein the retardation is small but the acceleration is large, (3) represents a state wherein the retardation is large but the acceleration is small and (4) represents a state wherein both the retardation and acceleration are large. Thus, the period (T2–T1) of generation of the output signal of the stage IV, that is, the brake releasing time varies so as to accommodate itself to a surface condition of a road.

More specifically, with a road surface having a large friction coefficient, as in the case of dry pavement, the retardation of the wheels is small as the brake is applied thereto and the acceleration of the wheels is larger when the brake is released. As shown in FIG. 4a(2), this causes the brake releasing time to be relatively short. On the contrary, with a road surface having a small friction coefficient, as in the case of an icy road, the retardation of the wheels is large and the acceleration thereof is small. This causes the brake releasing time to be relatively short as shown in FIG. 4a(3). When the retardation of the wheels becomes large because of a high speed of the vehicle, it is necessary to make the releasing time longer since it takes a longer time to accelerate the wheels. In this case, however, the characteristic shown in FIG. 4a (4) is exhibited and an effective operation is obtained. On the other hand, in the case of a vehicle moving at a low speed, or just before the vehicle stops, the speed of rotation of the wheels is low and the retardation is small. In the case illustrated in FIG. 4a (1), the releasing time is short even if the acceleration is large, and the releasing time never becomes too long. In this manner the brake is actuated and released repeatedly until the vehicle comes to a complete stop at last.

FIG. 1b represents another embodiment of the invention wherein the stages II, III and VI in FIG. 1 are modified and the circuit of FIG. 1a is further simplified.

More specifically, the emitter electrode of the transistor 8 in the stage I in FIG. 1 is connected through a series connection of a diode 51, a resistor 52, and a capacitor 53 to the terminal 41 and a resistor 54 is connected in parallel with the capacitor 53. A transistor 55 has the base electrode connected through a resistor 56 to the junction $t1$ (conductor 42) of the resistors 25 and 29 in the stage IV and also connected through a series connection of a diode 57 and a resistor 58 to the junction $t2$ (conductor 41) of the resistors 26 and 28 of the stage IV, the collector electrode connected to one end of the capacitor 53 and the emitter electrode connected through a resistor 59 to the junction $t2$ (conductor 41). The collector electrode of the transistor 55 is also connected to the base electrode of a transistor 60 having the collector electrode connected to the junction $t1$ (conductor 42) and the emitter electrode connected to the junction $t2$ (conductor 41) and also connected to the base electrode of the transistor 23 to constitute a circuit for current amplification and for impedance matching with the stage IV. The emitter of the transistor 8 in the stage I is connected through a resistor 62 to the emitter electrode of the transistor 55.

In operation, when the brake pedal is pressed to brake the wheels, a positive output signal appears at the emitter electrode of the transistor 8 in the stage I and is applied to the capacitor 53. The capacitor 53 is charged up with the positive signal from the stage I to a level which corresponds to a level of the signal through the resistor 52 and the diode 51. Since the resistor 52 has a small value, a voltage drop across it is small. According to the potential across the capacitor 53, an output signal appears at the emitter electrode of the transistor 55 and the potential across the capacitor is also applied to the stage IV. When the potential across the capacitor exceeds the preset level G of the stage IV, an output signal is generated from the stage IV and a releasing signal is applied to the releasing circuit in the stage V to release the brake of the wheels. The capacitor 53 is charged up to the potential corresponding to the level of the positive signal from the stage I and reaches the maximum corresponding to the maximum of the positive signal, and thereafter begins to discharge through the resistor 54. In other words, when the positive signal is generated from the stage I, the transistor 55 is nonconductive since the emitter potential of the transistor 55 is high, and the discharge of the capacitor 53 is carried out only through the resistor 54. When the potential of the capacitor 53 gradually decreases due to discharge and becomes lower than the preset level G of the stage IV the output signal of the stage IV ceases. Therefore, no releasing signal is applied to the stage V and the release of the brake is interrupted to activate the brake.

When the brake is released by the output signal from the stage IV as described above, the wheels are accelerated by the inertia of the vehicle and a negative output signal corresponding to the magnitude of acceleration is generated from the signal generator 1. The output signal from the stage I also becomes negative and the emitter potential of the transistor 55 is lowered. Since the base potential of said transistor 55 is maintained at a constant value, the transistor 55 conducts in response to decrease of the emitter potential. When the transistor 55 conducts, the discharge of the capacitor 53 is carried out through not only the resistor 54 but also the transistor 55 and the discharge time is shortened. The degree of conduction of the transistor 55 corresponds to the emitter potential of the transistor 55, that is, to the magnitude of the acceleration signal from the stage I and the greater acceleration results in quicker discharge of the capacitor 53. If the discharge of the capacitor 53 is accelerated, the output signal from the emitter electrode of the transistor 60 varies correspondingly, thus the time of interruption of the output signal from the stage IV is made earlier and the brake releasing time is shortened.

As in the case of the embodiment of FIG. 1a, the embodiment of FIG. 1b also exhibits such characteristic that the capacitor 53 is charged in response to the retardation signal of the stage I and, after the potential reaches the maximum level corresponding to the maximum of said signal, begins to discharge and the discharge is accelerated in accordance with the acceleration signal from the stage I and shortens the discharge time. Accordingly, in the embodiment of FIG. 1b, as in the case of the embodiment of FIG. 1a, the output signal from the stage IV or the duration of the releasing signal or the brake releasing time varies so as to accommodate itself to the surface condition of the road. The operation of the embodiment of FIG. 1b is analogous to that of the embodiment of FIG. 1a described in the above in conjunction with FIG. 4a.

What is claimed is:

1. An anti-skid brake control device in a wheeled vehicle for operating brake releasing means in accordance with signals from a control circuit, said control circuit comprising first means for generating a DC signal in accordance with retardation and acceleration of the wheels, charge storage means being charged in response to said DC signal from said first means correpsonding to retardation and discharged only in response to said DC signal. Corresponding to acceleration, second means for supplying a brake releasing signal during a period when the electrostatic charge stored in said charge storage means reaches a predetermined level, and third means for supplying a signal to said brake releasing means in accordance with said brake releasing signal from said second means.

2. An anti-skid brake control device according to claim 1, wherein said charge storage means includes a charging circuit for charging said means in response to said DC signal from said first means corresponding to retardation and a discharging circuit for discharging the stored electrostatic charge in said means only in response to said DC signal from said first means corresponding to acceleration, and said second means includes a discriminating circuit for determining the magnitude of the signal corresponding to the stored electrostatic charge in said charge storage means relative to said predetermined level and generating the brake releasing signal during the period when said stored electrostatic charge reaches said level.

3. An anti-skid brake control device, according to claim 2, wherein said discharging circuit includes means for increasing the magnitude of discharge of said stored electrostatic charge with an increase in the level of said DC signal corresponding to acceleration, whereby the length of the brake releasing signal tends to decrease with increase of the acceleration.

4. An anti-skid brake control device according to claim 2, wherein said charging circuit includes capacitive means which increases the magnitude of said electrostatic charge in said capacitive means with no increase in the level of said DC signal corresponding to retardation, whereby the length of the brake releasing signal tends to increase with the increase in the retardation.

5. An anti-skid brake control device according to claim 2, wherein said charging circuit stores the component of said DC signal which represents retardation, and said discharging circuit receives the component of said DC signal which represents acceleration and varies the magnitude of discharge.

6. An anti-skid brake control device according to claim 5, including a circuit interposed between said charge storage means and said second means for passing therethrough said DC signal only when the component representing the retardation reaches said predetermined level.

7. An anti-skid brake control device according to claim 5, wherein said discharging circuit includes a circuit having a resistance at its output which varies in accordance with said DC signal representing acceleration and which changes the magnitude of discharge of the electrostatic charge stored in the charge storage means.

References Cited

UNITED STATES PATENTS 3,026,148   3/1962   Ruof _____ 303—21
3,398,995   8/1968   Martin _____ 303—21 A4

MILTON BUCHLER, Primary Examiner

S. G. KUNIN, Assistant Examiner

U.S. Cl. X.R.

188—181 A; 303—20; 324—162; 340—262

UNITED STATES PATENT OFFICE
CERTIFICATE OF CORRECTION

Patent No. 3,615,120      Dated October 26, 1971

Inventor(s)    Hayao Yamazaki et al.

It is certified that error appears in the above-identified patent and that said Letters Patent are hereby corrected as shown below:

In the heading to the printed specification, lines 5 and 6, "Hayakawa Denkikogyo Kabushiki Kaisha, Osaka, Japan" should read -- Sharp Kabushiki Kaisha Abeno-ku, Osaka, Japan and said Okamoto assignor to Aisin Seiki Kabushiki Kaisha, Kariya-Shi, Aichi-ken, Japan, both companies of Japan --.

Signed and sealed this 16th day of May 1972.

(SEAL)
Attest:

EDWARD M. FLETCHER, JR.       ROBERT GOTTSCHALK
Attesting Officer      Commissioner of Patents